US009777357B2

(12) United States Patent
Mizutani et al.

(10) Patent No.: US 9,777,357 B2
(45) Date of Patent: Oct. 3, 2017

(54) STAINLESS STEEL FOIL

(71) Applicant: JFE STEEL CORPORATION, Tokyo (JP)

(72) Inventors: Akito Mizutani, Tokyo (JP); Mitsuyuki Fujisawa, Tokyo (JP); Hiroki Ota, Tokyo (JP); Hiroyuki Ogata, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 14/650,117

(22) PCT Filed: Dec. 5, 2013

(86) PCT No.: PCT/JP2013/007147
§ 371 (c)(1),
(2) Date: Jun. 5, 2015

(87) PCT Pub. No.: WO2014/097562
PCT Pub. Date: Jun. 26, 2014

(65) Prior Publication Data
US 2015/0299833 A1    Oct. 22, 2015

(30) Foreign Application Priority Data

Dec. 17, 2012 (JP) ................. 2012-274163

(51) Int. Cl.
| C22C 38/42 | (2006.01) |
| C22C 38/44 | (2006.01) |
| C22C 38/46 | (2006.01) |
| C22C 38/54 | (2006.01) |
| C22C 38/00 | (2006.01) |
| C22C 38/02 | (2006.01) |
| C22C 38/04 | (2006.01) |
| C22C 38/06 | (2006.01) |
| C22C 38/48 | (2006.01) |
| C22C 38/50 | (2006.01) |
| C21D 6/00 | (2006.01) |
| C21D 9/46 | (2006.01) |
| B01J 35/04 | (2006.01) |
| C21D 8/02 | (2006.01) |
| F01N 13/16 | (2010.01) |
| B01J 37/02 | (2006.01) |

(52) U.S. Cl.
CPC ............. *C22C 38/54* (2013.01); *C21D 6/002* (2013.01); *C21D 8/0268* (2013.01); *C21D 9/46* (2013.01); *C22C 38/00* (2013.01); *C22C 38/001* (2013.01); *C22C 38/002* (2013.01); *C22C 38/004* (2013.01); *C22C 38/005* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *B01J 35/04* (2013.01); *B01J* *37/0225* (2013.01); *C21D 8/0226* (2013.01); *C21D 8/0236* (2013.01); *F01N 13/16* (2013.01)

(58) Field of Classification Search
None
See application file for complete search history.

(56) References Cited

U.S. PATENT DOCUMENTS

| 5,228,932 A | 7/1993 | Shimizu |
| 5,411,610 A | 5/1995 | Araki |
| 8,580,190 B2 | 11/2013 | Hattendorf |
| 2007/0041862 A1 | 2/2007 | Hattendorf |
| 2008/0210348 A1 | 9/2008 | Goransson |
| 2010/0092749 A1 | 4/2010 | Hattendorf |
| 2011/0031235 A1 | 2/2011 | Hattendorf |

FOREIGN PATENT DOCUMENTS

| CN | 101205595 | 6/2008 |
| CN | 101892434 | 11/2010 |
| CN | 102021496 | 4/2011 |
| CN | 102102166 | 6/2011 |
| EP | 0497992 | 8/1992 |
| EP | 0516267 | 12/1992 |
| EP | 0597129 | 5/1994 |
| EP | 0750052 A1 * | 12/1996 |
| EP | 1740733 | 2/2009 |
| JP | 6456822 | 3/1989 |
| JP | 05202449 | 8/1993 |
| JP | 05277380 | 10/1993 |
| JP | 0953156 | 2/1997 |
| JP | 10140296 | 5/1998 |
| JP | 2000144344 | 5/2000 |
| JP | 2001316773 | 11/2001 |
| JP | 2009165979 | 7/2009 |
| JP | 2011179088 | 9/2011 |
| KR | 1020100133411 | 12/2010 |
| WO | 0100896 | 1/2001 |
| WO | 2009124530 | 10/2009 |

OTHER PUBLICATIONS

ASM—Table 1.1 entitled Essential and incidental elements in steel and cast iron, Introduction to Steels and Cast Iron, p. 3, $3^{rd}$ edtiion, 1997.*

(Continued)

*Primary Examiner* — Deborah Yee
(74) *Attorney, Agent, or Firm* — RatnerPrestia

(57) ABSTRACT

According to aspects of the invention, provided are an Fe—Cr—Al-based stainless steel sheet which has improved manufacturability by improving the toughness of a hot-rolled steel sheet and a cold-rolled steel sheet without deteriorating oxidation resistance at a high temperature and shape stability when used at a high temperature, and a stainless steel foil which is manufactured by rolling the stainless steel sheet. V and B are added in combination to Fe—Cr—Al-based stainless steel in amounts within specified ranges. Specifically, V content is controlled to be 0.010% or more and 0.050% or less and B content is controlled to be 0.0001% or more and 0.0050% or less, in which the relationship {V content (V %)}/{B content (B %)}>10 is satisfied.

6 Claims, No Drawings

(56) References Cited

OTHER PUBLICATIONS

International Search Report for International Application No. PCT/JP2013/007147 dated Feb. 18, 2014.
Extended European Search Report dated Mar. 3, 2016 for European Application No. 13864167.5-1373.
Chinese Office Action for Chinese Application No. 201380066148.9, dated May 3, 2016 with Concise Translation of Office Action, 14 pages.
Korean Office Action for Korean Application No. 2015-7012521, dated Jun. 1, 2016 with concise statement of relevance, 10 pages.
Chinese Office Action with partial English language translation for Application No. 201380066148.9, dated Nov. 30, 2016, 8 pages.
Japanese Office Action/Allowance with partial English language translation for Application No. JP 2014-511619, dated May 13, 2014, 5 pages.

\* cited by examiner

STAINLESS STEEL FOIL

CROSS REFERENCE TO RELATED APPLICATIONS

This is the U.S. National Phase application of PCT/JP2013/007147, filed Dec. 5, 2013, which claims priority to Japanese Patent Application No. 2012-274163, filed Dec. 17, 2012, the disclosures of each of these applications being incorporated herein by reference in their entireties for all purposes.

FIELD OF THE INVENTION

The present invention relates to a stainless steel sheet and a stainless steel foil which is manufactured by rolling the stainless steel sheet.

BACKGROUND OF THE INVENTION

Since Fe—Cr—Al-based stainless steel is excellent in oxidation resistance at a high temperature, the stainless steel is worked into a stainless steel foil so as to be used for the catalyst carrier for an exhaust gas purifying facility (metal honeycomb) of an automobile, a motorcycle, a marine bike, a motor boat, a large lawn mower, and a small electric generator.

Such a metal honeycomb has a honeycomb structure composed of, for example, a flat stainless steel foil (flat foil) and a stainless steel foil formed into a corrugated shape (corrugated foil) which are stacked in alternating layers and which are fixed to each other using a brazing method or the like. A catalytic material is applied to the surfaces of the stacked stainless steel foils, and the resulting metal honeycomb is used for an exhaust gas purifying facility.

A stainless steel foil for a metal honeycomb is desired to have not only oxidation resistance at a high temperature but also excellent brazability when honeycomb forming is performed and not to change its shape when used at a high temperature (if the shape is changed, exfoliation of a catalyst layer occurs or exhaust gas becomes hard to flow due to the crushed cells of a honeycomb structure).

Fe—Cr—Al-based stainless steel, which is excellent in these properties, is widely used in the form of a steel sheet for the members of a stove and a heating furnace and an electric heating element in addition to a metal honeycomb.

On the other hand, Fe—Cr—Al-based stainless steel is not good in toughness of the intermediate material (for example, the hot-rolled steel sheet or the cold-rolled steel sheet) in manufacturing process of a stainless steel foil, as compared with the other kinds of stainless steel. Therefore, it is difficult to manufacture Fe—Cr—Al-based stainless steel, because operation problems and a decrease in yield ratio occur by frequent fracture of the steel sheet during annealing and descaling of a hot-rolled steel sheet or during cold rolling.

As an example of a method for improving the toughness of Fe—Cr—Al-based stainless steel at the hot-rolled steel sheet and the cold-rolled steel sheet, Patent Literature 1 or Patent Literature 2 discloses a technique which improves toughness by stabilizing impurity elements such as C and N in steel through the addition of Ti or Nb. Patent Literature 3 discloses a technique which improves the deep drawability of a hot-rolled steel sheet and the surface roughening resistance of it after working is performed by stabilizing C and N in steel through the addition of Ti and Nb to ferritic stainless steel and by further adding appropriate amounts of V and B.

PATENT LITERATURE

PTL 1: Japanese Unexamined Patent Application Publication No. sho 64-56822
PTL 2: Japanese Unexamined Patent Application Publication No. Hei 5-277380
PTL 3: Japanese Unexamined Patent Application Publication No. 2000-144344

SUMMARY OF THE INVENTION

However, in the case of the method according to Patent Literature 1, since a large amount of Ti is added, a large amount of Ti oxides such as $TiO_2$ are mixed into an oxide layer, which causes a problem in that there is a significant deterioration in brazability and in that there is a deterioration in oxidation resistance at a high temperature.

In Patent Literature 2, in the case where a large amount of Nb is added, $(Fe, Al)NbO_4$ which has no oxidation resistance is formed in an oxide layer and there is a significant deterioration in oxidation resistance. In addition, since the oxides of Ti and Nb have high thermal expansion coefficients, a flat foil and a corrugated foil are deformed when used at a high temperature, which results in the problem of the exfoliation of a carried catalyst layer. In the case of such a method in which a large amount of stabilizing elements such as Nb and Ti are added, although there is an improvement in the toughness of a hot-rolled steel sheet and a cold-rolled steel sheet, there is a problem in that oxidation resistance and shape stability are deteriorated significantly at a high temperature. In the case of a method according to Patent Literature 3, since V and B are added in order to improve the deep drawability of a hot-rolled steel sheet, investigations for improving the toughness of Fe—Cr—Al-based stainless steel are not conducted either.

Aspects of the present invention provide an Fe—Cr—Al-based stainless steel sheet which has improved manufacturability by improving the toughness of a hot-rolled steel sheet and a cold-rolled steel sheet without deteriorating oxidation resistance at a high temperature or shape stability when used at a high temperature and to provide a stainless steel foil manufactured by rolling the stainless steel sheet.

The present inventors diligently conducted investigations, and as a result, found that a stainless steel sheet having excellent toughness can be obtained by adding V and B in combination in amounts within specified ranges to Fe—Cr—Al based stainless steel without deteriorating oxidation resistance at a high temperature or shape stability when used at a high temperature.

The present invention has been completed on the basis of the knowledge described above, and exemplary embodiments of the present invention include the following.

(1) A stainless steel sheet having a chemical composition containing, by mass %, C: 0.020% or less, Si: 1.0% or less, Mn: 1.0% or less, P: 0.040% or less, S: 0.004% or less, Cr: 16.0% or more and 30.0% or less, Al: 2.00% or more and 6.50% or less, N: 0.020% or less, Ni: 0.01% or more and 0.50% or less, Cu: 0.005% or more and 0.10% or less, Ti: less than 0.050%, Nb: less than 0.050%, V: 0.010% or more and 0.050% or less, B: 0.0001% or more and 0.0050% or less, at least one of Zr: 0.005% or more and 0.200% or less, Hf: 0.005% or more and 0.200% or less, and REM: 0.01% or more and 0.20% or less, and the balance being Fe and inevitable impurities, in which the relationship {V content (V %)}/{B content (B %)}>10 is satisfied.

(2) The stainless steel sheet according to item (1), in which the steel sheet has the chemical composition further containing, by mass %, at least one of Ca: 0.0002% or more and 0.0100% or less and Mg: 0.0002% or more and 0.0100% or less.

(3) The stainless steel sheet according to item (1) or (2), in which the steel sheet has the chemical composition further containing, by mass %, at least one of Mo: 0.5% or more and 6.0% or less and W: 0.5% or more and 6.0% or less, and the total content of Mo and W is 0.5% or more and 6.0% or less.

(4) A stainless steel foil having the chemical composition according to any one of items (1) to (3) and a thickness of 200 μm or less.

Embodiments of the present invention include a stainless steel sheet excellent in toughness and oxidation resistance and shape stability at a high temperature can be obtained. A stainless steel foil which is manufactured using this stainless steel sheet is also excellent in oxidation resistance and shape stability at a high temperature. The stainless steel sheet and the stainless steel foil according to aspects of the present invention can be suitably used not only for a catalyst carrier for the exhaust gas purifying facility of, an automobile, a motorcycle, a marine bike, a snowmobile, and a ship but also for other combustion gas exhaust system members.

DETAILED DESCRIPTION OF EMBODIMENTS OF THE INVENTION

Embodiments of the present invention will be described hereafter. Here, the present invention is not limited to the embodiments described below.

First, the chemical composition of steel constituting the stainless steel sheet and the stainless steel foil of exemplary embodiments will be described in detail. In the case of the stainless steel sheet and the stainless steel foil, the stainless steel sheet has excellent toughness, and in addition, the stainless steel foil exhibits sufficient oxidation resistance and is less likely to be deformed even if the stainless steel foil is used at a high temperature. The reasons for the limitations on the constituents of the chemical composition of steel of the stainless steel sheet and the stainless steel foil will be described hereafter.

Each percentage represented by "%", which is the unit of the contents of the constituent chemical elements described below, refers to "mass %".

C: 0.020% or less

In the case where the C content is more than 0.020%, there is a deterioration in the toughness of a hot-rolled steel sheet and a cold-rolled steel sheet, and it is difficult to manufacture a stainless steel foil. Therefore, the C content is set to be 0.020% or less, preferably 0.015% or less, or more preferably 0.010% or less. Although the C content may be 0%, it is preferable that the C content is 0.002% or more, because there is difficulty in manufacturing due to a long time being taken for refining to decrease C content extremely.

Si: 1.0% or less

In the case where the Si content is more than 1.0%, there is a deterioration in the toughness of a hot-rolled steel sheet and a cold-rolled steel sheet, and it is difficult to manufacture a stainless steel foil. Therefore, the Si content is set to be 1.0% or less, preferably 0.5% or less, or more preferably 0.2% or less. However, it is preferable that the Si content is 0.01% or more, because there is difficulty in refining to decrease Si content to be less than 0.01%.

Mn: 1.0% or less

In the case where the Mn content is more than 1.0%, the oxidation resistance of steel is lost or diminished. Therefore, the Mn content is set to be 1.0% or less, preferably 0.5% or less, or more preferably 0.15% or less. However, it is preferable that the Mn content is 0.01% or more, because there is difficulty in refining for decreasing the Mn content to be less than 0.01%.

P: 0.040% or less

In the case where the P content is more than 0.040%, there is a deterioration in the toughness and ductility of steel, and it is difficult to manufacture a stainless steel foil. Therefore, the P content is set to be 0.040% or less, or preferably 0.030% or less. It is more preferable that the P content is as small as possible.

S: 0.004% or less

In the case where the S content is more than 0.004%, there is a deterioration in hot workability, and it is difficult to manufacture a hot-rolled steel sheet. Therefore, the S content is set to be 0.004% or less, preferably 0.003% or less, or more preferably 0.002% or less.

Cr: 16.0% or more and 30.0% or less

Cr is a chemical element which is essential for achieving oxidation resistance at a high temperature. In the case where the Cr content is less than 16.0%, it is difficult to achieve sufficient oxidation resistance at a high temperature. On the other hand, in the case where the Cr content is more than 30.0%, there is a deterioration in the toughness of a slab and a hot-rolled steel sheet which are intermediate materials for manufacturing a stainless steel foil, and it is difficult to manufacture a stainless steel foil. Therefore, the Cr content is set to be 16.0% or more and 30.0% or less, preferably 17.0% or more and 26.0% or less, or more preferably 17.0% or more and 22.0% or less.

Al: 2.00% or more and 6.50% or less

Al is a chemical element which significantly improves oxidation resistance as a result of forming an oxide layer mainly containing $Al_2O_3$ when a product is subjected to high-temperature oxidation (when the product is used in the form of, for example, a foil). The effect is obtained in the case where the Al content is 2.00% or more. On the other hand, in the case where the Al content is more than 6.50%, it is difficult to manufacture a stainless steel foil due to a deterioration in the toughness of steel. Therefore, the Al content is set to be 2.00% or more and 6.50% or less, or preferably 2.50% or more and 6.00% or less.

N: 0.020% or less

In the case where the N content is more than 0.020%, there is a deterioration in the toughness of steel, and it is difficult to manufacture a stainless steel foil. Therefore, the N content is set to be 0.020% or less, or preferably 0.010% or less. Although the N content may be 0%, it is preferable that the N content is 0.002% or more, because there is difficulty in manufacturing due to a long time being taken for refining to decrease the N content extremely.

Ni: 0.05% or more and 0.50% or less

Ni is effective for improving brazability when a catalyst carrier is formed. Therefore, the Ni content is set to be 0.05% or more. However, Ni is an austenite-forming element. In the case where the Ni content is more than 0.5%, an austenite phase is formed after Al in the foil has been consumed by oxidation after oxidation progressing at a high temperature. This austenite phase increases the thermal expansion coefficient of the foil, which results in problems such as the constriction and fracturing of the foil. Therefore, the Ni content is set to be 0.05% or more and 0.50% or less, preferably 0.01% or more and 0.50% or less, or more preferably 0.10% or more and 0.20% or less.

Cu: 0.005% or more and 0.10% or less

Cu is effective for increasing high-temperature strength as a result of being precipitated in steel. Therefore, the Cu content is set to be 0.005% or more. On the other hand, in the case where Cu is added and the content is more than 0.10%, there is a deterioration in the toughness of steel. Therefore, the Cu content is set to be 0.005% or more and 0.10% or less, or preferably 0.005% or more and 0.05% or less.

Ti: less than 0.050%

In the case where the Ti content is 0.050% or more, since a large amount of Ti oxide is mixed into an $Al_2O_3$ layer, there is a deterioration in brazability and there is a deterioration also in oxidation resistance and shape stability at a high temperature. Therefore, the Ti content is set to be less than 0.050%, or preferably less than 0.020%. It is more preferable that the Ti content is as small as possible.

Nb: less than 0.050%

In the case where the Nb content is 0.050% or more, an oxide layer of $(Fe, Al)NbO_4$, which has no protective performance, is formed, and there is a significant deterioration in oxidation resistance at a high temperature. In addition, since the thermal expansion coefficient of $(Fe, Al)NbO_4$ is high, a foil becomes more likely to deform, which results in the exfoliation of catalyst. Therefore, the Nb content is set to be less than 0.050%, or preferably less than 0.020%. It is more preferable that the Nb content is as small as possible.

V: 0.010% or more and 0.050% or less, B: 0.0001% or more and 0.0050% or less, and {V content (V %)}/{B content (B %)}>10

V and B are chemical elements having beneficial functions in embodiments of the present invention. The present inventors found that, by adding V and B to Fe—Cr—Al-based stainless steel in amounts within appropriate ranges, it is possible to improve the toughness of a hot-rolled steel sheet and a cold-rolled steel sheet even if chemical elements such as Ti and Nb, which deteriorate oxidation resistance, are not added in amounts sufficient to improve toughness. In order to obtain such an effect, it is desirable that the relationships V: 0.010% or more and 0.050% or less, B: 0.0001% or more and 0.0050% or less, and V %/B %>10 be satisfied. The reasons why such an effect is obtained are presumed to be as described in the following items (1) to (3).

(1) V improves the toughness of a hot-rolled and annealed steel sheet and a cold-rolled steel sheet by the recrystallized grain refinement as a result of suppressing grain growth during annealing. The reasons why such an effect is obtained is thought to be a pinning effect due to the precipitation of fine V carbonitrides or an effect of preventing coarsening of recrystallized grains by solid solute V.

(2) B suppresses the precipitation of Cr carbonitrides at the grain boundaries, which is one of the causes of a deterioration in the toughness of a hot-rolled steel sheet and a cold-rolled annealed steel sheet, by decreasing grain boundary energy as a result of B being concentrated at the crystal grain boundaries. However, it is thought that in the case where B is excessively concentrated at the grain boundaries, B precipitations are formed conversely, and there is a deterioration in toughness.

(3) The reason why the effects described above change in accordance with the mass ratio of the V content and the B content (V %/B %) is thought that there is an optimum ratio between the V content and the B content, because the V content has an influence on the amount of B concentrated at grain boundaries as a result of change of a grain boundary area in accordance with the V content.

Here, in the case where V and B are precipitated in the form of nitrides, a satisfactory effect is not obtained. In embodiments of the present invention, since a large amount of Al content, which has a high affinity for N, is contained in the stainless steel sheet, V and B are not precipitated in the form of nitrides, which results in a satisfactory effect for improving toughness being realized.

In order to obtain the effect described above, it is desirable that the contents of V and B be respectively 0.010% or more and 0.0001% or more. However, there is a deterioration in oxidation resistance in the case where the V content is more than 0.050%, and there is conversely a deterioration in toughness in the case where the B content is more than 0.005%. Therefore, the V content is set to be 0.010% or more and 0.050% or less, and the B content is set to be 0.0001% or more and 0.0050% or less. Moreover, even in the case where the V content and the B content are within the ranges described above, if V %/B % (V content/B content) is 10 or less, refining of crystal grains does not progress, causing a decrease in a grain boundary area and the concentration of B excessively progresses at grain boundaries, which results in a deterioration in toughness. Therefore, the mass ratio V %/B % is set to be more than 10. Moreover, in the case where a steel sheet is manufactured under circumstances with a low steel sheet temperature or the like, it is preferable that V %/B % is more than 20, because it is advantageous to improve the toughness of a hot-rolled steel sheet and a cold-rolled steel sheet furthermore.

In addition, the stainless steel sheet according to one embodiment further contains at least one of Zr: 0.005% or more and 0.200% or less, Hf: 0.005% or more and 0.200% or less, and REM: 0.01% or more and 0.20% or less in addition to the constituents described above.

An $Al_2O_3$ oxide layer formed on an Fe—Cr—Al-based stainless steel which does not contain such constituents has poor adhesion to the base metal. Therefore, spalling of the $Al_2O_3$ oxide layer occurs every time the temperature changes from high to low in practical service, and that steel do not achieve good oxidation resistance. Zr, Hf, or REM is effective for improving oxidation resistance because they prevent the spalling of the $Al_2O_3$ oxide layer by improving the adhesion of the $Al_2O_3$ oxide layer. Appropriate amounts of Zr, Hf, and REM are also effective for decreasing the growth rate of the $Al_2O_3$ oxide layer and for improving oxidation resistance. In addition, Zr is effective for improving toughness by stabilizing C and N in stainless steel.

Zr: 0.005% or more and 0.200% or less

Zr improves the adhesion of an $Al_2O_3$ oxide layer and improves oxidation resistance by decreasing the growth rate of the layer. In addition, Zr improves toughness by stabilizing C and N. Such effects are obtained in the case where the Zr content is 0.005% or more. However, in the case where the Zr content is more than 0.20%, since a large amount of Zr oxides, is mixed into the $Al_2O_3$ oxide layer, there is an increase in the growth rate of the oxide layer, which results in a deterioration in oxidation resistance. In addition, Zr combines with, for example, Fe to form an intermetallic compound, which deteriorates the toughness of stainless steel. Therefore, the Zr content is set to be 0.005% or more and 0.200% or less, or preferably 0.020% or more and 0.100% or less.

Hf: 0.005% or more and 0.200% or less

Hf improves oxidation resistance because it improves the adhesion of an $Al_2O_3$ oxide layer to steel and decreases the growth rate of the layer. Such effects are obtained in the case where the Hf content is 0.005% or more. However, in the case where the Hf content is more than 0.200%, a large amount of Hf oxides is mixed into the $Al_2O_3$ oxide layer, and there is an increase in the growth rate of the oxide layer, which results in a deterioration in oxidation resistance. In addition, Hf combines with, for example, Fe to form an intermetallic compound, which deteriorates toughness. Therefore, the Hf content is set to be 0.005% or more and 0.200% or less, or preferably 0.020% or more and 0.100% or less.

Here, in the case where Zr and Hf are added at the same time, it is preferable that the total content of these chemical elements is not more than 0.20% from the viewpoint of ensuring sufficient toughness.

REM (rare earth metals): 0.01% or more and 0.20% or less

"REM" refers to Sc, Y, and lanthanoids (chemical elements having an atomic number of 57 to 71 such as La, Ce, Pr, Nd, and Sm). Since REM improve the adhesion of an $Al_2O_3$ oxide layer, REM are significantly effective for improving the spalling resistance of the $Al_2O_3$ oxide layer in an environment in which oxidation is repeatedly performed. Therefore, it is particularly preferable that REM is added in the case where excellent oxidation resistance is required. In order to obtain such effects, it is desirable that the total content of REM be 0.01% or more. On the other hand, in the case where the REM content is more than 0.20%, there is a deterioration in hot workability, and it is difficult to manufacture a hot-rolled steel sheet. Therefore, the REM content is set to be 0.01% or more and 0.20% or less, or preferably 0.03% or more and 0.10% or less. Here, in the case where REM are added, metal (such as misch metal) which has not been subjected to separation and refinement may be used in order to decrease cost.

It is preferable that, in addition to the constituents described above, at least one of Ca and Mg be further contained in specified amounts in the stainless steel sheet according to embodiments of the present invention.

Ca: 0.0002% or more and 0.0100% or less and Mg: 0.0002% or more and 0.0100% or less Appropriate amount of Ca or Mg improves oxidation resistance by improving the adhesion of an $Al_2O_3$ oxide layer to steel and by decreasing the growth rate of the layer. Such an effect is obtained when the Ca content is 0.0002% or more or the Mg content is 0.0002% or more in the case where one of Ca and Mg is added. It is more preferable that the content is 0.0010% or more in the case of Ca and that the content is 0.0015% or more in the case of Mg. However, there is a deterioration in toughness and oxidation resistance in the case where these chemical elements are added excessively. Therefore, in the case where one of Ca and Mg is added, it is preferable that the content of Ca or Mg are 0.0100% or less in either case, or more preferably 0.0050% or less in either case.

It is preferable that, in addition to the constituents described above, at least one of Mo and W is further added in specified amount to steel used in embodiments of the present invention.

Total content of Mo and W: 0.5% or more and 6.0% or less

Mo and W increase high-temperature strength. Therefore, Mo and W increase the service life of a catalyst carrier when a stainless steel sheet or a stainless steel foil is used for the catalyst carrier. Such an effect is obtained in the case where the total content of Mo and W is 0.5% or more. On the other hand, in the case where the total content of Mo and W is more than 6.0%, it is difficult to manufacture a stainless steel foil due to a deterioration in workability. Therefore, the total content of Mo and W is set to be 0.5% or more and 6.0% or less, or preferably 2.5% or more and 5.5% or less.

The remainder of the chemical composition other than constituents described above consists of Fe and inevitable impurities. Examples of the inevitable impurities include Co, Zn, and Sn, and it is preferable that the contents of these chemical elements is respectively 0.3% or less.

Subsequently, the stainless steel sheet will be described. The stainless steel sheet is a plate-shaped steel material having the chemical composition described above. There is no particular limitation on what manufacturing method is used to manufacture the stainless steel sheet, and examples of the manufacturing method include one in which steel having the chemical composition described above is produced by melting using a converter or an electric furnace, in which the steel is subjected to refining using VOD or AOD, the refined steel is made into a slab by performing slabbing rolling or continuous casting, the slab is heated at a temperature of 1050° C. to 1250° C., and the heated slab is subjected to hot rolling. In addition, the stainless steel sheet may be one which is manufactured by performing sandblasting, steel grid blasting, alkali degreasing, or a pickling treatment on the hot-rolled steel sheet described above in order to remove scale or contamination on the surface of the steel material. In addition, the stainless steel sheet may be a cold-rolled steel sheet which is manufactured by performing cold rolling on the hot-rolled steel sheet described above.

Subsequently, the stainless steel foil will be described. The stainless steel foil according to an embodiment is manufactured by rolling the stainless steel sheet according to aspects of the present invention. Usually, by performing cold rolling on a hot-rolled steel sheet from the surface of which scale, contamination, or the like has been removed, and by further repeatedly performing annealing and cold rolling, a stainless steel foil having a desired thickness is manufactured.

Although there is no particular limitation on the thickness of the stainless steel foil, in the case where the stainless steel foil according to an embodiment of the invention is used for a catalyst carrier for an exhaust gas purifying facility, it is advantageous to have the thickness as thin as possible in order to decrease exhaust back pressure. However, since a catalyst carrier for an exhaust gas purifying facility is used in an environment harsher than that of other applications, there may be a case where the stainless steel foil is cut or broken. Therefore, it is preferable that the thickness of the stainless steel foil be 20 to 200 μm. In addition, there is a case where a catalyst carrier for an exhaust gas purifying facility is required to have excellent vibration resistance and durability. In this case, it is preferable that the thickness of the stainless steel foil is about 100 to 200 μm. In addition, there is a case where a catalyst carrier for an exhaust gas purifying facility is required to have high cell density and low back pressure. In this case, it is more preferable that the thickness of the stainless steel foil is about 20 to 100 μm.

EXAMPLES

Embodiments of the present invention will be described more specifically using examples hereafter. Note that the present invention is not limited to the examples described below.

Steels having the chemical compositions given in Table 1 which had been prepared using a small-scale vacuum melting furnace having a capacity of 50 kg were heated at a temperature of 1200° C., and then the heated steels were made into hot-rolled steel sheets having a thickness of 3 mm by performing hot rolling in a temperature range of 900° C. to 1200° C. In the case of steel No. 20 where the Al content is over the range according to embodiments of the present invention, a sound hot-rolled steel sheet was not obtained due to the occurrence of a crack when hot rolling was performed, and a foil could not be manufactured. Therefore, evaluation tests for it could not be conducted. Subsequently, the hot-rolled steel sheets other than steel No. 20 were subjected to annealing in atmospheric air at a temperature of 900° C. for duration of 1 minute and pickling in order to remove scale on the surface, and then made into cold-rolled steel sheets having a thickness of 1.0 mm by performing cold rolling. Thereafter, cold rolling and annealing were repeatedly performed plural times using a cluster mill in order to obtain a stainless steel foil having a width of 100 mm and a thickness of 50 μm.

Using the hot-rolled steel sheets and the stainless steel foil obtained as described above, the toughness of the hot-rolled steel sheets and the oxidation resistance and shape stability of the stainless steel foil at a high temperature were evaluated respectively.

(1) Toughness of Hot-Rolled Steel Sheet

The toughness of the hot-rolled steel sheet was evaluated by performing a Charpy impact test. A test piece was prepared based on a V-notched test piece in accordance with JIS (JIS Z 2202 (1998)). Only the thickness (referred to as width in JIS) of the test piece was unchanged and was 3 mm which was the thickness of the hot-rolled steel sheet as hot-rolled. The test piece was taken such that the longitudinal direction of the test piece was parallel to the rolling direction, and the notch was formed in a direction at a right angle to the rolling direction. The test was performed for three test pieces for each temperature in accordance with JIS (JIS Z 2242 (1998)) in order to determine absorbed energy and a brittle fracture rate, and a transition curve was obtained. A ductile-brittle transition temperature (DBTT) was defined as a temperature at which the brittle fracture rate was 50%. A case where the DBTT was lower than 120° C. was judged as "⊚" (excellent), a case where the DBTT was 120° C. or higher and 150° C. or lower was judged as "◯" (satisfactory), and a case where the DBTT was higher than 150° C. was judged as "x" (unsatisfactory). It had been confirmed in advance that cold rolling could be stably performed at room temperature in the case where the DBTT which is determined by performing a Charpy impact test is 150° C. or lower. It is more preferable that the DBTT is lower than 120° C., because cold rolling can be performed more stably in an environment in which the temperature of a steel sheet is likely to be lowered as in the case where cold rolling is performed in winter.

(2) Oxidation Resistance of a Stainless Steel Foil at High Temperature

The stainless steel foil having a thickness of 50 μm was subjected to a heating treatment (equivalent to a heating treatment which is performed when diffusion joining or brazing joining is performed) at a temperature of 1200° C. for a duration of 30 minutes in a vacuum of $5.3 \times 10^{-3}$ Pa or lower. Three test pieces having a width of 20 mm and a length of 30 mm were taken from the stainless steel foil which had been subjected to the heat treatment. These test pieces were oxidized by performing a heat treatment in atmospheric air kept at a temperature of 1100° C. for a duration of 400 hours, and the average weight gain by oxidation (a value which was derived by dividing a change in weight before and after the heating by an original surface area) of the three test pieces was determined. At this time, the spalling of the oxide layer was not observed in any of the test pieces. A case where the determined average weight gain by oxidation was 10 g/m² or less was judged as "⊚" (excellent), a case where the average weight gain was more than 10 g/m² and 15 g/m² or less was judged as "◯" (satisfactory), and a case where the average weight gain was more than 15 g/m² was judged as "x" (unsatisfactory). The example is advantageous in the case of "⊚" or "◯".

(3) Shape Stability of a Stainless Steel Foil at High Temperature

The stainless steel foil having a thickness of 50 μm was subjected to a heating treatment (equivalent to a heating treatment which is performed when diffusion joining or brazing joining is performed) at a temperature of 1200° C. for a duration of 30 minutes in a vacuum of $5.3 \times 10^{-3}$ Pa or lower. Three test pieces having a width of 100 mm and a length of 50 mm were taken from the stainless steel foil which had been subjected to the heat treatment, each of the test pieces was wound in the longitudinal direction in order to form a cylinder having a diameter of 5 mm, and the edges were joined by performing spot welding. These test pieces were oxidized by performing a heat treatment in atmospheric air kept at a temperature of 1100° C. for a duration of 400 hours, and the average change in length (an increase ratio of the cylinder length after the heating to the cylinder length before the heating) of the three test pieces was determined. A case where the determined average change in length was 3% or less was judged as "⊚" (excellent), a case where the change in length was more than 3% and 5% or less was judged as "◯" (satisfactory), and a case where the change in length was more than 5% was judged as "x" (unsatisfactory). The example is advantageous in the case of "⊚" or "◯".

The results are given in Table 2. For example, in the case of steel No. 14, since V/B is out of the range according to embodiments of the present invention, the toughness of the hot-rolled steel sheet was poor. In the case of steel No. 1 and steel No. 5 where V/B is within the range according to embodiments of the present invention and other constituents are almost the same as those of steel No. 14, it is clarified that the toughness of the hot-rolled steel sheet was excellent. By comparing steel No. 1 and steel No. 5, steel No. 5, in which V/B was more than 20, was superior to steel No. 1 in toughness of a hot-rolled steel sheet. As described above, steel Nos. 1 to 13, which are the example of embodiments of the present invention, were excellent or satisfy in toughness of a hot-rolled steel sheet and the oxidation resistance and shape stability of a foil at a high temperature. On the other hand, steel Nos. 14 to 20, which are the comparative examples, were poor in at least one of toughness of a hot-rolled steel sheet and the oxidation resistance and shape stability of a foil at a high temperature. From the results described above, according to aspects of the present invention, it is possible to obtain Fe—Cr—Al-based stainless steel and a stainless steel foil which have excellent toughness and oxidation resistance.

TABLE 1

| Steel No. | Chemical Composition (mass %) | | | | | | | | | | | |
|---|---|---|---|---|---|---|---|---|---|---|---|---|
| | C | Si | Mn | P | S | Cr | Al | N | Ni | Cu | Ti | Nb |
| 1 | 0.005 | 0.15 | 0.09 | 0.026 | 0.001 | 20.3 | 5.81 | 0.005 | 0.15 | 0.04 | 0.012 | 0.012 |
| 2 | 0.015 | 0.13 | 0.12 | 0.022 | 0.002 | 17.9 | 3.42 | 0.009 | 0.21 | 0.02 | 0.015 | 0.002 |
| 3 | 0.009 | 0.21 | 021 | 0.023 | 0.001 | 25.3 | 5.46 | 0.008 | 0.19 | 0.03 | 0.008 | 0.004 |
| 4 | 0.012 | 0.31 | 0.19 | 0.031 | 0.001 | 20.6 | 5.69 | 0.008 | 0.16 | 0.05 | 0.042 | 0.003 |
| 5 | 0.006 | 0.16 | 0.15 | 0.025 | 0.001 | 20.1 | 5.76 | 0.006 | 0.14 | 0.02 | 0.004 | 0.002 |
| 6 | 0.008 | 0.15 | 0.16 | 0.026 | 0.003 | 18.2 | 3.37 | 0.007 | 0.16 | 0.01 | 0.003 | 0.002 |
| 7 | 0.008 | 0.10 | 0.14 | 0.023 | 0.001 | 20.1 | 5.79 | 0.007 | 0.15 | 0.02 | 0.015 | 0.003 |
| 8 | 0.006 | 0.12 | 0.11 | 0.022 | 0.001 | 18.2 | 3.41 | 0.008 | 0.18 | 0.05 | 0.040 | 0.042 |
| 9 | 0.009 | 0.31 | 0.25 | 0.031 | 0.001 | 19.4 | 5.32 | 0.007 | 0.26 | 0.04 | 0.005 | 0.003 |
| 10 | 0.004 | 0.40 | 0.16 | 0.026 | 0.001 | 20.7 | 3.61 | 0.006 | 0.21 | 0.02 | 0.004 | 0.002 |
| 11 | 0.008 | 0.16 | 0.17 | 0.020 | 0.001 | 20.4 | 5.81 | 0.006 | 0.15 | 0.08 | 0.003 | 0.003 |
| 12 | 0.011 | 0.17 | 0.39 | 0.022 | 0.001 | 25.6 | 5.69 | 0.008 | 0.19 | 0.06 | 0.004 | 0.001 |
| 13 | 0.003 | 0.21 | 021 | 0.035 | 0.001 | 29.4 | 5.74 | 0.005 | 0.15 | 0.04 | 0.046 | 0.0038 |
| 14 | 0.009 | 0.41 | 0.23 | 0.029 | 0.001 | 20.4 | 5.79 | 0.009 | 0.16 | 0.02 | 0.004 | 0.001 |
| 15 | 0.008 | 0.19 | 0.23 | 0.031 | 0.001 | 20.0 | 5.91 | 0.009 | 0.14 | 0.03 | <u>0.12</u> | 0.003 |
| 16 | 0.006 | 0.15 | 0.21 | 0.032 | 0.001 | <u>14.6</u> | 5.61 | 0.006 | 0.16 | 0.04 | 0.006 | 0.005 |
| 17 | 0.008 | 0.16 | 0.16 | 0.028 | 0.001 | 20.1 | <u>1.86</u> | 0.007 | 0.15 | 0.03 | 0.005 | 0.003 |
| 18 | 0.007 | 0.18 | 0.17 | 0.032 | 0.002 | 20.3 | 5.79 | 0.009 | 0.12 | 0.02 | 0.004 | <u>0.11</u> |
| 19 | 0.006 | 0.14 | 0.09 | 0.025 | 0.001 | 20.1 | 5.83 | 0.005 | 0.15 | 0.04 | 0.005 | 0.005 |
| 20 | 0.012 | 0.17 | 0.27 | 0.029 | 0.001 | 25.3 | <u>7.14</u> | 0.006 | 0.10 | 0.05 | 0.006 | 0.016 |

| Steel No. | Chemical Composition (mass %) | | | | | | | | | | |
|---|---|---|---|---|---|---|---|---|---|---|---|
| | V | B | Zr | Hf | REM | Ca | Mg | Mo | W | V/B | Note |
| 1 | 0.013 | 0.0009 | 0.031 | — | La/0.08 | 0.0048 | 0.0023 | — | — | 14 | Example |
| 2 | 0.022 | 0.0002 | 0.022 | — | La/0.05, Ce/0.03 | 0.0034 | 0.0033 | — | — | 110 | Example |
| 3 | 0.022 | 0.0008 | — | — | Y/0.12 | — | 0.0036 | — | — | 28 | Example |
| 4 | 0.021 | 0.0003 | 0.161 | — | — | 0.0032 | 0.0033 | — | — | 70 | Example |
| 5 | 0.020 | 0.0008 | 0.033 | — | La/0.07 | — | — | — | — | 25 | Example |
| 6 | 0.047 | 0.0002 | 0.183 | — | — | 0.0024 | 0.0048 | — | — | 235 | Example |
| 7 | 0.024 | 0.0008 | 0.042 | — | La/0.09 | 0.0035 | 0.0040 | — | — | 30 | Example |
| 8 | 0.047 | 0.0015 | 0.043 | — | La/0.08 | 0.0049 | 0.0024 | — | — | 31 | Example |
| 9 | 0.044 | 0.0032 | 0.039 | — | Sm/0.07 | 0.0020 | — | — | — | 14 | Example |
| 10 | 0.040 | 0.0009 | — | 0.051 | Y/0.09 | 0.0033 | 0.0049 | — | — | 44 | Example |
| 11 | 0.031 | 0.0008 | 0.041 | — | La/0.05, Nd/0.03 | 0.0027 | 0.0030 | 5.1 | — | 39 | Example |
| 12 | 0.020 | 0.0007 | 0.054 | 0.024 | La/0.08 | 0.0029 | 0.0045 | 3.0 | 1.2 | 29 | Example |
| 13 | 0.030 | 0.0008 | 0.061 | — | La/0.09 | 0.0037 | 0.0032 | — | 2.9 | 38 | Example |
| 14 | 0.020 | 0.0048 | 0.021 | — | La/0.07 | 0.0023 | 0.0022 | — | — | <u>4.2</u> | Comparative Example |
| 15 | 0.031 | 0.0009 | — | — | Y/0.11 | 0.0041 | 0.0037 | — | — | 34 | Comparative Example |
| 16 | 0.022 | 0.0015 | 0.056 | — | La/0.05, Ce/0.03 | 0.0041 | 0.0044 | — | — | 15 | Comparative Example |
| 17 | 0.033 | 0.0023 | 0.054 | — | La/0.08 | 0.0039 | 0.0044 | — | — | 14 | Comparative Example |
| 18 | 0.022 | 0.0010 | — | — | La/0.08 | 0.0034 | 0.0036 | — | — | 22 | Comparative Example |
| 19 | <u>0.058</u> | 0.0009 | 0.031 | — | La/0.08 | 0.0048 | 0.0023 | — | — | 64 | Comparative Example |
| 20 | 0.024 | 0.0008 | 0.049 | — | La/0.05 | 0.0034 | 0.0042 | — | — | 30 | Comparative Example |

Annotation: An underlined portion indicates a value out of the range according to the present invention.

TABLE 2

| | Toughness of Hot-rolled Steel Sheet (3 mm in thickness) | | Oxidation Resistance at High Temperature | | Shape Stability at High Temperature | | |
|---|---|---|---|---|---|---|---|
| Steel No. | DBTT (° C.) | Judgment | Weight gain (g/m$^2$) | Judgment | Change in Shape (%) | Judgment | Note |
| 1 | 125 | ○ | 7.4 | ◎ | 3.4 | ○ | Example |
| 2 | 95 | ◎ | 12.3 | ○ | 4.1 | ○ | Example |
| 3 | 140 | ○ | 6.9 | ◎ | 1.9 | ◎ | Example |
| 4 | 125 | ○ | 7.1 | ◎ | 3.2 | ○ | Example |
| 5 | 90 | ◎ | 7.6 | ◎ | 3.5 | ○ | Example |
| 6 | 85 | ◎ | 12.5 | ○ | 4.2 | ◎ | Example |
| 7 | 105 | ◎ | 5.9 | ◎ | 0.9 | ◎ | Example |
| 8 | 80 | ◎ | 8.6 | ◎ | 1.3 | ◎ | Example |
| 9 | 110 | ◎ | 6.1 | ◎ | 2.4 | ◎ | Example |
| 10 | 90 | ◎ | 8.3 | ◎ | 2.1 | ◎ | Example |
| 11 | 125 | ○ | 11.3 | ○ | 0.8 | ◎ | Example |
| 12 | 130 | ○ | 8.4 | ◎ | 0.9 | ◎ | Example |
| 13. | 145 | ○ | 7.6 | ◎ | 3.2 | ○ | Example |
| 14 | 150 | X | 14.3 | ○ | 4.1 | ○ | Comparative Example |
| 15 | 110 | ◎ | 69.8 | X | 9.4 | X | Comparative Example |

TABLE 2-continued

| Steel No. | Toughness of Hot-rolled Steel Sheet (3 mm in thickness) | | Oxidation Resistance at High Temperature | | Shape Stability at High Temperature | | Note |
| --- | --- | --- | --- | --- | --- | --- | --- |
| | DBTT (° C.) | Judgment | Weight gain (g/m$^2$) | Judgment | Change in Shape (%) | Judgment | |
| 16 | 80 | ⊚ | 55.1 | X | 9.5 | X | Comparative Example |
| 17 | 50 | ⊚ | 72.4 | X | 10.6 | X | Comparative Example |
| 18 | 130 | ○ | 79.6 | X | 15.8 | X | Comparative Example |
| 19 | 100 | ⊚ | 39.1 | X | 8.6 | X | Comparative Example |
| 20 | | | Rolling Uncompleted | | | | Comparative Example |

The invention claimed is:

1. A stainless steel foil having a chemical composition containing, by mass %, C: 0.020% or less, Si: 0.2% or less, Mn: 1.0% or less, P: 0.040% or less, S: 0.004% or less, Cr: 16.0% or more and 30.0% or less, Al: 2.00% or more and 6.50% or less, N: 0.020% or less, Ni: 0.05% or more and 0.50% or less, Cu: 0.005% or more and 0.10% or less, Ti: less than 0.050%, Nb: less than 0.050%, V: 0.010% or more and 0.050% or less, B: 0.0001% or more and 0.0050% or less, Mo: 2.5% or more and 6.0% or less, at least one of Zr: 0.005% or more and 0.200% or less, Hf: 0.005% or more and 0.200% or less, and REM (rare earth metals): 0.01% or more and 0.20% or less, and the balance being Fe and inevitable impurities and having a thickness of 200 μm or less, wherein a relationship {V content (V %)}/{B content (B %)}>10 is satisfied.

2. The stainless steel foil according to claim 1, wherein the steel foil has the chemical composition further containing, by mass %, at least one of Ca: 0.0002% or more and 0.0100% or less and Mg: 0.0002% or more and 0.0100% or less.

3. The stainless steel foil according to claim 1, wherein the steel foil has the chemical composition further containing, by mass %, W: 0.5% or more and 6.0% or less, provided such that a total content of Mo and W is 3.0% or more and 6.0% or less.

4. The stainless steel foil according to claim 2, wherein the steel foil has the chemical composition further containing, by mass %, W: 0.5% or more and 6.0% or less, provided such that a total content of Mo and W is 3.0% or more and 6.0% or less.

5. The stainless steel foil according to claim 1, wherein the steel foil has the chemical composition containing, by mass %, Ni: 0.10% or more and 0.50% or less.

6. The stainless steel foil according to claim 1, wherein the steel foil has the chemical composition containing, by mass %, Si: 0.17% or less.

* * * * *